Dec. 12, 1961  H. MÜLLER  3,012,790
QUICK CHANGE CHUCK
Filed Jan. 18, 1960  2 Sheets-Sheet 1

INVENTOR
HEINZ MÜLLER
BY Lowry & Rinehart
ATTYS.

Dec. 12, 1961  H. MÜLLER  3,012,790
QUICK CHANGE CHUCK
Filed Jan. 18, 1960  2 Sheets-Sheet 2
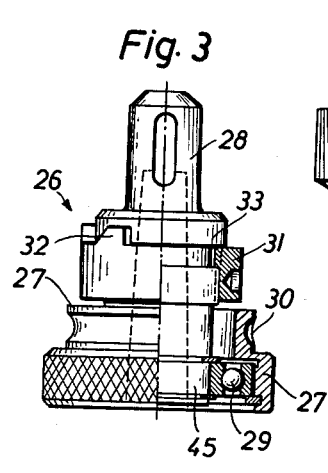
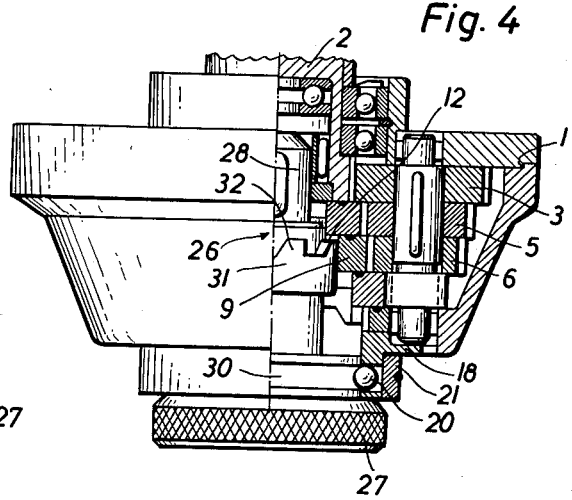
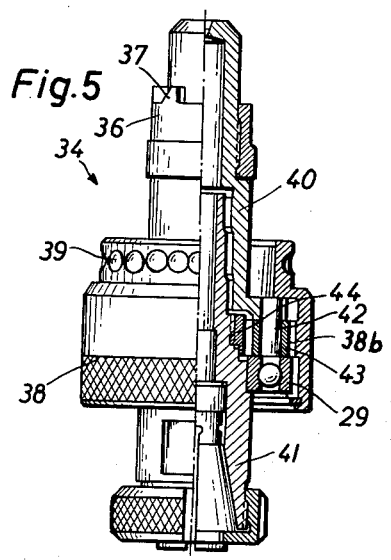
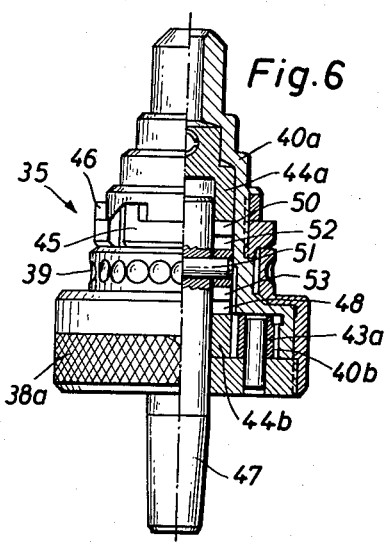
INVENTOR
HEINZ MÜLLER
BY
Lowry & Rinehart
ATTYS.

3,012,790
QUICK CHANGE CHUCK
Heinz Müller, Engelskirchen, Bezirk Koln, Germany, assignor to Rheinische Zahnbohrer und Kleinfraserfabrik & Co., Engelskirchen, Bezirk Koln, Germany
Filed Jan. 18, 1960, Ser. No. 3,026
Claims priority, application Germany Jan. 19, 1959
15 Claims. (Cl. 279—14)

This invention relates to chucks and like tool-holders, for machine drills, boring machines, reamers and the like in which the boring or other tool is interchangeably held in a chuck, and its purpose is to facilitate the exchange of tools.

There are quick change devices known for twist drills, taps, countersinks, boring rods, reamers and the like which permit exchange of tools in any desired order in a simple fashion while the machine is running, but such known devices require a change in speed and feed in the machine, and for that reason the machine must usually be brought to rest and much time is lost. Also, in these chucks every part is rotating which increases the risk of accidents.

It is an object of the invention to eliminate the foregoing disadvantages. In the present invention, the housing that is to be attached to the machine is stationary, and in this housing is mounted gearing driven by the machine and including a plurality of driving wheels, while a tool-carrying adaptor when inserted in the housing engages one or the other of these wheels. Preferably the housing contains a driving spindle which drives a gear shaft carrying and driving spur wheels of various diameters. Through these spur wheels the inserted adaptor is driven. To this end the spur wheels may drive toothed rings with clutch parts, for example, dog teeth, to engage corresponding clutch parts in the adaptor.

When this semi-automatic quick change device is employed on a drilling machine, it is possible to drive different adaptors at different speeds without making any change in the machine or in the quick change device. The feed per revolution changes simultaneously in inverse proportion to the gearing ratio. The number of speeds is limited only by the size of the device. It may gear up or gear down from the driving spindle. Or the quick change device may include a continuously variable gear or other variable gear which may be actuated, for example, by adjustable lugs on the interchangeable adaptors. There may also be an abutment on the adaptor to limit its depth of entry into the chuck. Adaptors are exchanged while the machine is running by simple rotation of the adaptor. Since the housing of the device is stationary the operator does not touch any moving part, so risk of accident is to a great extent eliminated.

The adaptors are fitted with clutch parts corresponding to the speed at which they are respectively to be driven and these engage with corresponding clutch parts of the appropriate gear. The adaptors on insertion may be locked to the housing by a snap fastening, for instance, by a spring-pressed ball or the like.

In the accompanying drawing:

FIG. 3 shows an adaptor partly in elevation and partly in section;

FIG. 4 shows the quick change chuck of FIG. 1 with an adaptor inserted therein and partly in elevation and partly in section; and FIGS. 5 and 6 show other constructions of adaptor partly in elevation and partly in section.

Figure 1:
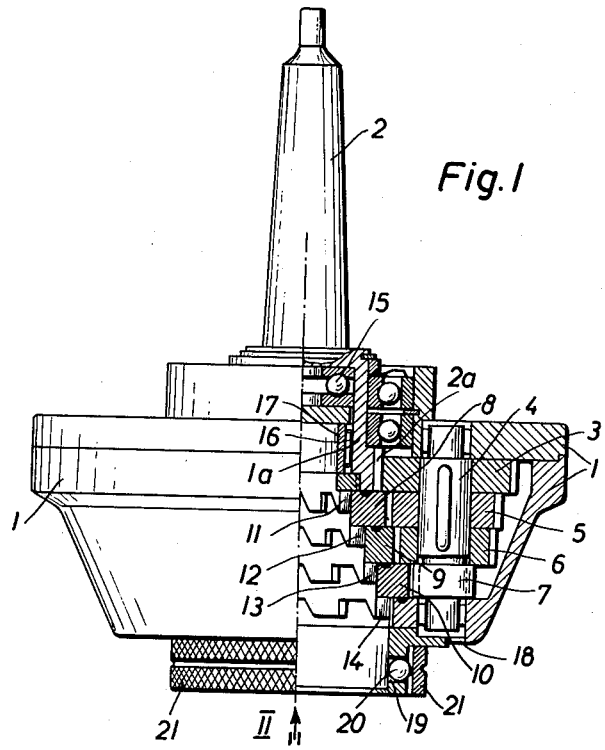
FIG. 1 is a side elevational view, partly in axial section, and showing a semi-automatic quick change chuck according to the invention.
Figure 2:
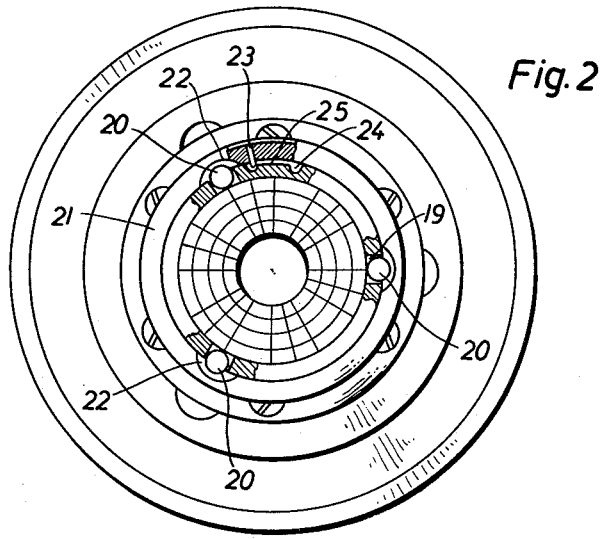
FIG. 2 is a bottom plan of the device of FIG. 1 as seen in the direction of the arrow II of FIG. 1.

The quick-change chuck of the invention includes a housing 1 which abuts against or is attached to a non-rotating part of a machine. The driving spindle 2 has a tapered or cylindrical shaft or like means for coupling to a machine drive. The spindle is mounted in bearings in the housing 1 and is provided with a sleeve 1a that carries spur teeth 2a which mesh with a spur gear 3 keyed on a shaft 4 that is mounted in the housing 1. On the shaft 4 are keyed other spur gears 5, 6, 7, and these spur gears mesh with toothed rings 8, 9, 10 within the housing. The teeth 2a, 8, 9, and 10 are coaxial with the driving spindle 2. The number of teeth 2a, and the number of teeth of the spur gears 3, 5, 6, 7 and of the rings 8, 9 and 10 are so chosen that the rings rotate at different speeds which may be greater or less than the speed of the spindle 2. Each toothed ring 2a, 8, 9, 10 carries driving lugs or dog teeth 11, 12, 13, 14 to engage corresponding coupling parts on adaptors. The spur gears 3, 5, 6, 7 are in constant mesh with the corresponding toothed rings 2a, 8, 9, or 10. Within the sleeve 1a integral with spindle 2 which carries the teeth 2a, there is a thrust bearing 15 and also a roller bearing 16 with an inner race 17.

To the bottom of the housing 1 is attached a flanged ring 18 coaxial with the driving spindle 2. One or more radial bores 19 in this ring accommodate a bearing ball 20 which is an easy fit. The bores 19 are coned or not carried right through, so that the balls 20 cannot fall out. They are confined on the outer side by the ring 21 in which are recesses 22 which the balls can enter when the ring 21 is turned to register the recesses with the balls. The extent to which ring 21 can turn is limited by a pin 23, preferably spring-loaded, engaging in a groove 25 having deepened ends 24.

The adaptor, indicated as a whole by the numeral 26, has a cap-like ring 27 that is held on the part 28 to be inserted in the chuck by a ball bearing 29. There is a groove 30 around the ring 27 into which the balls of the chuck 20 can fall. The part 28 is the driven spindle which receives the tool. On the driven spindle is a coupling part 31 with teeth 32 adapted to engage with 11, 12, 13 or 14 on the driving spindle 2 and toothed rings 8, 9, and 10. The collar 33 centers the driven spindle and the adaptor 26 in the chuck 1. To insert the adaptor, the ring 21 is first turned to bring the balls 20 opposite the receiver 22. Then an adaptor 26 (FIG. 4) corresponding to the adaptor of FIG. 3, is inserted and the ring 21 is turned in the reverse direction so that the balls 20 are forced into the groove 30 in the cap 27. In the example illustrated in FIG. 4 the teeth 32 of the adaptor 26 engage with the teeth 12 of the tooth ring 9, so that the operative speed is that given by the gearing 6–9. To change the adaptor while the machine is running the retaining ring 21 is turned to allow the balls 20 to fall into the recesses 22, thereby freeing the cap 27. Any other easily operated fastening may be used to retain the cap.

FIGS. 5 and 6 show other constructions of adaptors 34 and 35. These are in the main like the adaptor 26 shown in FIG. 3, being merely longer or shorter. The adaptor 34 is designed to bring the teeth 37 of its coupling part 36 into engagement with the teeth 11 of the toothed ring 8. In place of a circumferential groove 30 the cap 38 has separate recesses 39 into which the balls 20 can enter. In the driven spindle 40 there is journaled a further spindle 41 which receives a corresponding tool. The lower end of the spindle is formed as a gripping head. Upon a pin 42 carried by the spindle 40 there is journaled a pinion 43 which meshes with spur teeth 44 on the spindle 41 and with internal teeth 38a upon the stationary cap 38b. This forms a planetary gear which drives the spindle 41 in the same direction as the spindle 40 and at an increased speed.

In the adaptor 35 the coupling part 45 having teeth 46 is close to the cap 38a, so that when the adaptor is inserted in the chuck the teeth 46 engage with the teeth 14 of the toothed ring 10. This adaptor has a further part 47 inserted therein. The spindle 40a has like the adaptor 34, one or more pinions 43 meshing with a toothed ring 44b which also has clutch teeth 48 and also with internal teeth 40b on spindle 40a. The sleeve 44a also has clutch teeth 50. The driven spindle 47 is attached by a cross pin 51 to a ring having clutch teeth 52, 53 on its opposite faces. Accordingly as the teeth 52 engage the teeth 50 or the teeth 53 engage the teeth 48, the spindle 47 will be driven through the planet gearing 43a, 44a at an increased speed in the same direction as, or in the opposite direction to, the spindle 40a.

What is claimed is:

1. A quick change chuck for drilling, boring, reaming and like machines, comprising a stationary housing attached to the machine, constantly meshed multiple ratio gearing in the housing driven by the machine and an adaptor interchangeably inserted in the housing in selected predetermined driving engagement with the driven gearing.

2. In a quick change chuck as in claim 1, a driving spindle in the housing supporting the driven gearing and the driven gearing including gear wheels of different diameters to take adaptors of different diameters.

3. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors.

4. A quick change chuck for drilling, boring, reaming and like machines, comprising a stationary housing attached to the machine, constantly meshed multiple ratio gearing in the housing driven by the machine and an adaptor interchangeably inserted in the housing in selected predetermined driving engagement with the driven gearing, a driven spindle carried by the adaptor and a snap connection between the housing and the adaptor.

5. In a quick change chuck as in claim 1, a driving spindle in the housing supporting the driven gearing and the driven gearing including gear wheels of different diameters to take adaptors of different diameters, a driven spindle carried by the adaptor and a snap connection between the housing and the adaptor.

6. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors, a driven spindle carried by the adaptor and a snap connection between the housing and the adaptor.

7. In a quick change chuck as in claim 1, a driving spindle in the housing supporting the driven gearing and the driven gearing including gear wheels of different diameters to take adaptors of different diameters, a driven spindle carried by the adaptor, a snap connection between the housing and the adaptor, and an end thrust bearing and annular roller bearings for the driving spindle.

8. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors, a driven spindle carried by the adaptor, a snap connection between the housing and the adaptor, and an end thrust bearing and annular roller bearings for the driving spindle.

9. In a quick change chuck as in claim 1, a driving spindle in the housing supporting the driven gearing and the driven gearing including gear wheels of different diameters to take adaptors of different diameters, a driven spindle carried by the adaptor, a snap connection between the housing and the adaptor, an end thrust bearing and annular roller bearings for the driving spindle, and ball and roller bearings in the adaptor for the driven spindle.

10. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors, a driven spindle carried by the adaptor, a snap connection between the housing and the adaptor, an end thrust bearing and annular roller bearings for the driving spindle, and ball and roller bearings in the adaptor for the driven spindle.

11. In a quick change chuck as in claim 1, a driving spindle in the housing supporting the driven gearing and the driven gearing including gear wheels of different diameters to take adaptors of different diameters, a driven spindle carried by the adaptor, a snap connection between the housing and the adaptor, an end thrust bearing and annular roller bearings for the driving spindle, ball and roller bearings in the adaptor for the driven spindle, and planetary gearing in the adaptor associated with the driven spindle for effecting automatic reverse rotation of the driven spindle.

12. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors, a driven spindle carried by the adaptor, a snap connection between the housing and the adaptor, an end thrust bearing and annular roller bearings for the driving spindle, ball and roller bearings in the adaptor for the driven spindle, and planetary gearing in the adaptor associated with the driven spindle for effecting automatic reverse rotation of the driven spindle.

13. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors, a driven spindle carried by the adaptor, a snap connection between the housing and the adaptor, an end thrust bearing and annular roller bearings for the driving spindle, ball and roller bearings in the adaptor for the driven spindle, and planetary gearing in the adaptor associated with the driven spindle for effecting automatic reverse rotation of the driven spindle, the gearing in the adaptor being in stepped arrangement.

14. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors, a driven spindle carried by the adaptor, a snap connection between the housing and the adaptor, an end thrust bearing and annular roller bearings for the driving spindle, ball and roller bearings in the adaptor for the driven spindle, and planetary gearing in the adaptor associated with the driven spindle for effecting automatic reverse rotation of the driven spindle, the driven spindle in the adaptor being axially movable.

15. In a quick change chuck as in claim 1, a driving spindle in the housing supporting the driven gearing and the driven gearing including gear wheels of different diameters to take adaptors of different diameters, spur toothed rings in the housing meshing with the gear wheels and coacting clutch teeth on the rings and adaptors, a driven spindle carried by the adaptor, a snap connection between the housing and the adaptor, an end thrust bearing and annular roller bearings for the driving spindle, ball and roller bearings in the adaptor for the driven spindle, and planetary gearing in the adaptor associated with the driven spindle for effecting automatic reverse rotation of the driven spindle, the driven spindle in the adaptor being pivotally supported.

References Cited in the file of this patent

UNITED STATES PATENTS

| | | |
|---|---|---|
| 2,428,049 | Tate | Sept. 30, 1947 |
| 2,534,951 | Cargill | Dec. 19, 1950 |
| 2,742,796 | Zorich | Apr. 24, 1956 |